United States Patent [19]

Nakamura et al.

[11] 4,287,589
[45] Sep. 1, 1981

[54] TRANSMISSION-RECEPTION APPARATUS

[75] Inventors: Hiroya Nakamura, Kunitachi; Yasuhide Nishida, Hachioji, both of Japan

[73] Assignee: Konishiroku Photo Industry Co., Ltd., Tokyo, Japan

[21] Appl. No.: 66,528

[22] Filed: Aug. 15, 1979

[51] Int. Cl.³ .............................................. H04L 5/16
[52] U.S. Cl. .................................................... 370/31
[58] Field of Search ..................... 370/31, 32, 24, 111, 370/29; 371/62; 375/108; 178/4.1 R, 4.1 A

[56] References Cited

U.S. PATENT DOCUMENTS

| | | | |
|---|---|---|---|
| 3,496,293 | 2/1970 | Avery et al. | 370/31 |
| 3,843,834 | 10/1974 | Burke | 370/31 |
| 4,110,560 | 8/1978 | Leary et al. | 370/31 |
| 4,159,448 | 6/1979 | Parham | 370/29 |

*Primary Examiner*—Thomas A. Robinson
*Attorney, Agent, or Firm*—James E. Nilles

[57] ABSTRACT

A transmission-reception apparatus wherein signals are bidirectionally and mutually transmitted and received between a transmitter and a receiver using a single transmission line, characterized in that the input and output portions of the transmitter and the receiver are respectively equipped with bidirectional line drivers and with flip-flops that are set by signals received through the line drivers, are reset by signals transmitted through the line drivers and change over the line drivers to signal transmission and reception. Said receiver is equipped with a counter for counting the number of signal receptions, a decoder for decoding the output of the counter and means for discriminating the reception signals by means of the output of the decoder.

3 Claims, 7 Drawing Figures

TRANSMISSION-RECEPTION APPARATUS

BACKGROUND OF THE INVENTION

This invention relates to a transmission-reception apparatus and specifically to a transmission-reception apparatus for electric information signals in a recording apparatus for composite-information consisting of a copying machine which is furnished also with a means for recording external electric information signals.

It is an object of the present invention to provide a transmission-reception apparatus capble of high speed transmission and reception of electric information between a recorder (receiver) and a reader (transmitter) of a composite recording apparatus, which records electric information signals in addition to its copying function, by the use of a single transmission line and a relatively simple transmission-reception circuit.

In a transmission-reception apparatus such as the above-mentioned recording apparatus for composite-information wherein transmission and reception of signals between the transmission side and the reception side are carried out through a single transmission line and synchronizing signals are periodically fed from the reception side to the transmission side, another object of the present invention is to provide a transmission-reception apparatus which stops the feed of the synchronizing signals at the time of trouble at the reception side so that the trouble is detected on the transmission side.

Other objects and features of the present invention will become apparent from the following detailed description taken in conjunction with the accompanying drawings.

DETAILED DESCRIPTION OF THE PREFERRED EMBODIMENT

Figure 1:
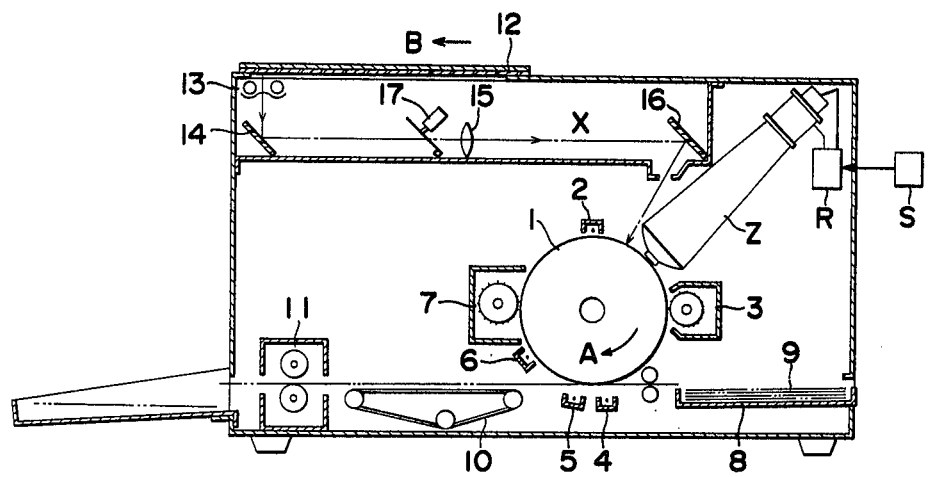
FIG. 1 is a schematic view showing the general construction of a recording apparatus for composite-information and useful for explaining an example of the application of the transmission-reception apparatus in accordance with the present invention.

As a recording apparatus for composite-information consisting of a copying machine which is additionally furnished with means for the recording of external electric information signals, there has been known a recording apparatus such as shown in FIG. 1. Around the periphery of a photosensitive drum 1 are disposed a corona charging electrode 2, a developing device 3 such as a magnetic brush developing device, a transfer electrode 4, a separating electrode 5, a discharging electrode 6 and a cleaning device 7 in the direction of rotation of arrow A and in the order mentioned. A recording paper or a copying paper 9 (hereinafter referred to as recording paper) supplied from a magazine 8 via feed rollers passes through between the photosensitive drum 1 and the transfer electrode 4. During a period of copying or a recording operation, a toner image formed on the photosensitive drum is transferred onto the recording paper which then passes through a conveyor device 10 and a heat fixing device 11 whereby the toner image on the recording paper is melted and fixed thereon as is well known in the art. The transferred paper on which the toner image is visualized is taken out through a paper receiving means.

On the upper portion of the housing is placed a copy board 12 which will be moved at a controlled speed in the direction of arrow B in accordance with the copying operation. The copy board 12 is illuminated by a source of light 13 located just beneath it. Between the copy board 12 and the photosensitive drum 1 is provided an exposure optical system X consisting of a first mirror 14, a lens 15 and a second mirror 16. The image of the original placed on the copy board 12 is formed on the circumferential surface of the photosensitive drum 1 between the corona charging electrode 2 and the developing device 3 so that the picture of the original is progressively formed on the photosensitive drum 1 as an electrostatic latent image.

A reproducing device Z having an electrical/optical conversion means such as optical fiber tube (OFT) to direct a recording face is provided on the circumferential surface of the photosensitive drum 1 between the corona charging electrode 2 and the developing device 3. To the input terminals of the reproducing device Z are fed electric information signals or facsimile output signals stored in a memory such as an electronic computer or the like, so that the picture signified by the electric information is scanned and reproduced on the photosensitive drum 1 as an electrostatic latent image. While the reproducing device Z is in operation, the source of light 13 is cut off or the shutter 17 is closed to halt the operation of the optical system X.

Figure 2:
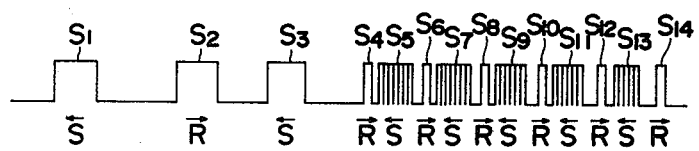
FIG. 2 is a diagram showing the signal system of the transmission-reception apparatus in accordance with the present invention.

FIG. 2 illustrates the transmission-reception signal system in the present invention wherein each arrow S represents a signal to be sent from the transmitter to the receiver while each arrow R represents a signal to be sent from the receiver to the transmitter.

An interrupt-demand signal $S_1$ is sent from the transmission side to the reception side. In response to this signal $S_1$, the receiver sends a preparation-ready signal $S_2$ to the transmitter when preparation is completed for recording a piece of information from the outside.

When the interrupt-demand signal $S_1$ is applied during copying of an original on the copy board 12, in the case of the aforementioned composite recording apparatus, copying is stopped when copying of one page of the original is completed, and the apparatus then enters the mode for recording of external signals. Upon receiving the preparation-ready signal $S_2$ from the receiver, the transmitter transmits a transmission-start signal $S_3$ to the receiver. Upon receiving this signal $S_3$, the receiver in turn starts recording and feeds a main scan-synchronizing signal $S_4$. According to this synchronizing signal $S_4$, the transmitter scans the recorded signal and sends a picture signal $S_5$ read in this manner to the receiver. Thereafter, the transmitter sends to the receiver the picture signals $S_7$, $S_9$, $S_{11}$ ... that are read by the former in synchronism with the main scan-synchronizing signals $S_6$, $S_8$, $S_{10}$ ... from the receiver. In this way, the picture signals covering the information of one page of the original are sent from the transmitter to the receiver while the receiver records the electric signals covering that one page of information.

Figure 3:
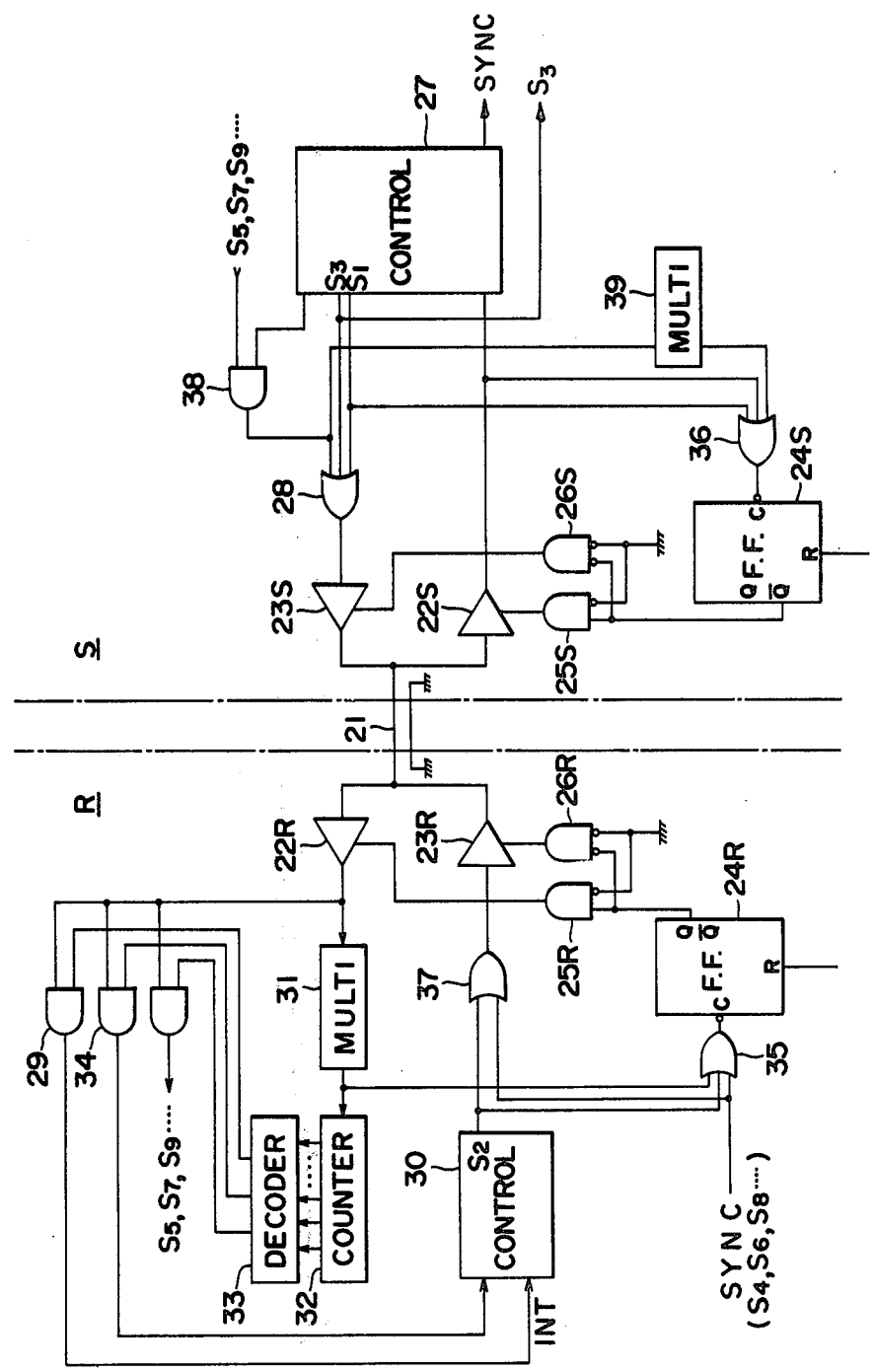
FIG. 3 is a circuit diagram showing the transmission-reception apparatus in accordance with the present invention.

FIG. 3 shows an embodiment of the transmission-reception circuit of the transmitter and the receiver in accordance with the abovementioned signal system. The transmitter S and the receiver R, connected with each other by a single transmission line 21, each have a bidirectional line driver consisting of an input buffer 22S, 22R and an output buffer 23S, 23R so that signals from the transmission side are taken into the input buffer 22R on the reception side from the output buffer 23S, through the transmission line 21, while signals from the reception side are taken into the input buffer 22S on the transmission side from the output buffer 23R through the transmission line 21. The action of the input- and output buffers 22R, 23R, 22S, 23S on both reception- and transmission sides is switched over by flip-flops 24R, 24S in cooperation with buffer gates 25R, 26R, 25S, 26S.

When the flip-flops 24R and 24S are in an initial reset state, the input buffer 22R on the reception side is maintained in a state to receive signals and the output buffer 23S is maintained in a state to transmit signals. Under these conditions the interrupt-demand signal (signal $S_1$ in FIG. 2), produced by a control section 27 of the transmitter S, is sent to the receiver through an OR gate 28 and through the output buffer 23S, and the receiver takes this signal $S_1$ through the input buffer 22R whereby the signal $S_1$ is applied through an AND gate 29 to a control section of the receiver, such as to an interrupt input INT of a micro-computer 30, for example. At its rear end the signal $S_1$ sets the count value of a counter 32 to $+1$ through a monostable multi-vibrator 31 and the output of the counter 32 closes the AND gate 29 and opens a subsequent AND gate 34 through the decoder 33.

The output of the monostable multi-vibrator 31 sets the flip-flop 24R through an OR gate 35, whereby input buffer 22R on the reception side is closed while the output buffer 23R is opened. In similar manner, on the transmission side, the rear end of the signal $S_1$ sets the flip-flop 24S through an OR gate 36, whereby the output buffer 23S is closed and the input buffer 22S is kept open. When interruption becomes possible on the receiver R side in response to the interrupt-demand signal $S_1$, a start-ready signal (signal $S_2$ in FIG. 2) is produced from the control section 30 of the receiver and is sent through an OR gate 37 and the output buffer 23R and to the control section 27 of the transmitter through its input buffer 22S. Hence, the control section 27 starts read-control of the recorded information.

The flip-flop 24S of the transmitter is reset at the rear end of the signal $S_2$ whereby the input buffer 22S is closed and the output buffer 23S is opened. When reading of the recorded information is started, the control section 27 first sends a start signal $S_3$ to the receiver, which takes out the signal $S_3$ from the AND gate 34 whereby the control section 30 starts information record-control, such as rotation of the photosensitive drum, feed of the recording paper and so forth in FIG. 1. On the side of the receiver, which is now in the record-control mode, it sequentially feeds the synchronizing signals SYNC (signal $S_4$, $S_6$, $S_8$ . . . in FIG. 2). Whenever a control section 27 receives the synchronizing signals on the transmission side, it opens an AND gate 38 and feeds one of a sequence of picture signals (signals $S_5$, $S_7$, $S_9$. . . in FIG. 2). Since the synchronizing signals SYNC and the picture signals are alternately produced as output, they set and reset alternately both flip-flops 24R and 24S, thereby changing over the input- and output buffers 22S, 22R, 23S, 23R.

Reference numerals 39 and 31 represent monostable multi-vibrators that both have the same time limit, and this time limit corresponds to the period for transmission of one frame of the picture signals. The picture signals on the reception side are suitably separated into individual frames by means of the output of a decoder 33, or are applied as continuous signals to the recorder.

Incidentally, the picture signals may be analog signals instead of being pulse train signals. In such a case, the transmission-reception route of the picture signals is an analog switch circuit in place of the logical operation circuit.

As described above, the transmission-reception apparatus in accordance with the present invention consists of the transmitter and the receiver, each equipped with the bidirectional line driver and with the flip-flop for chaning over the line driver, so that transmission and reception are bidirectionally effected between them through the single transmission line and their switching is accomplished by means of setting and resetting of the flip-flops. Accordingly, the apparatus of the present invention enables line change to be accomplished at a higher speed than by sequence control using a micro-computer or the like. Moreover, the receiver in the present apparatus discriminates the reception signals by the use of the counter which counts the number of the reception signals and the decoder which decodes the output of the counter. Hence, high speed processing of the reception signals is feasible.

Figure 4:
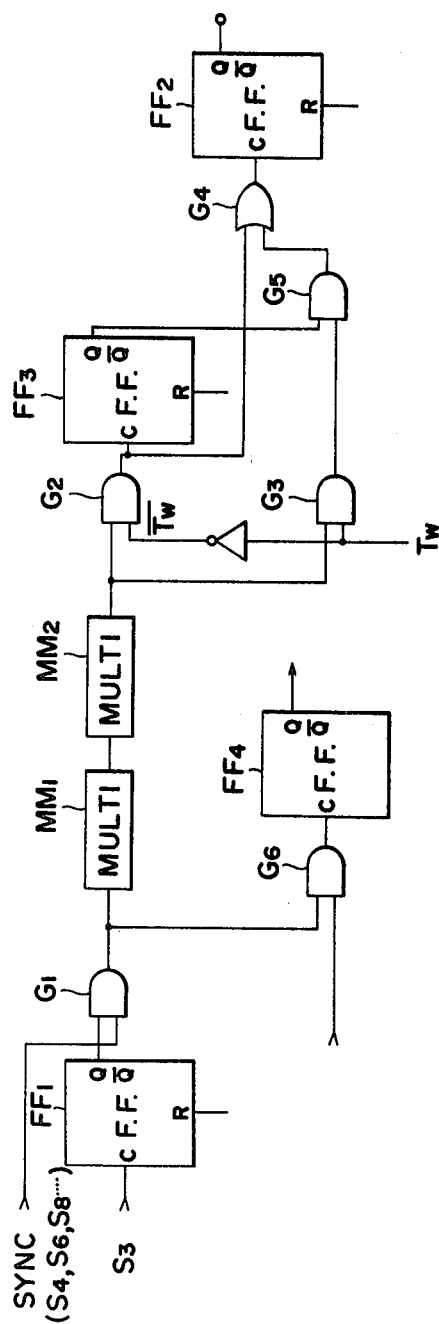
FIG. 4 is a block diagram useful for explaining the trouble detection circuit of the transmission-reception apparatus in accordance with the present invention.

FIG. 4 is a circuit diagram showing an example of the trouble detection circuit in the transmission-reception apparatus in accordance with the present invention. Simultaneously with transmission of the transmission start signal $S_3$ from the transmission side to the reception side, the start signal $S_3$ is applied as a set input to a flip-flop $FF_1$ whereby an AND gate $G_1$ is opened and the synchronizing signals $S_4$, $S_6$ . . . that are being fed from the reception side are applied as input to a re-trigger type monostable multi-vibrator $MM_1$. The time constant of this retrigger type monostable multi-vibrator is set to a value greater than the period of the synchronizing signals $S_4$, $S_6$, . . . . The output of a monostable multi-vibrator $MM_2$ (differential circuit), which is triggered by the rear end output of the monostable multi-vibrator $MM_1$, is applied to gates $G_2$ and $G_3$. To the other terminals of these gates $G_3$, $G_2$ are applied a signal $T_w$ which is changed over by the last signal of the synchronizing signals $S_4$, $S_6$ . . . and its inversion signal $\overline{T_w}$. The output of the gate $G_2$ is used as a clock input to flip-flop $FF_3$ and also as a clock input through an OR gate $G_4$ to a flip-flop $FF_2$ as the trouble detection output.

The output of the gate $G_3$ is applied as input to the abovementioned OR gate $G_4$ through an AND gate $G_5$ which is opened only while the flip-flop $FF_3$ is set. The output of the AND gate $G_1$ is applied a clock input to a flip-flop $FF_4$ through an AND gate $G_6$ which uses, as its gate input, those signals which are generated from the record start till the generation, as output, of the first synchronizing signal. The output of the AND gate $G_1$ resets compulsively the flip-flop FF and further the monostable multi-vibrators $MM_1$, $MM_2$ till the flip-flop $FF_4$ is set.

Figure 5A:
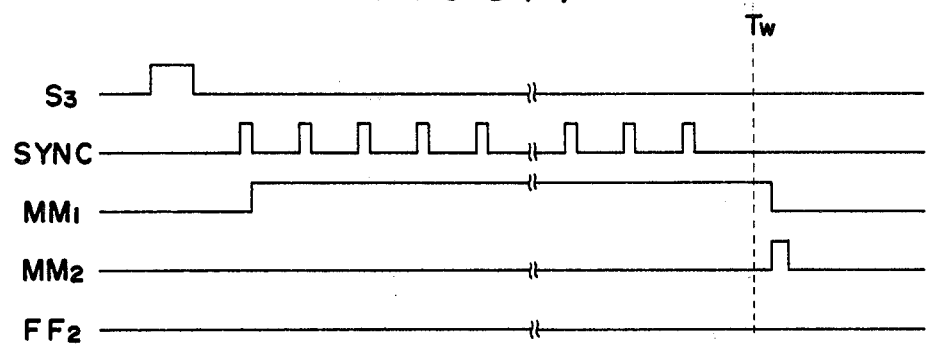
FIGS. 5(a) through 5(c) are time-charts useful for explaining the action of the circuit of FIG. 4, respectively.
Figure 5B:
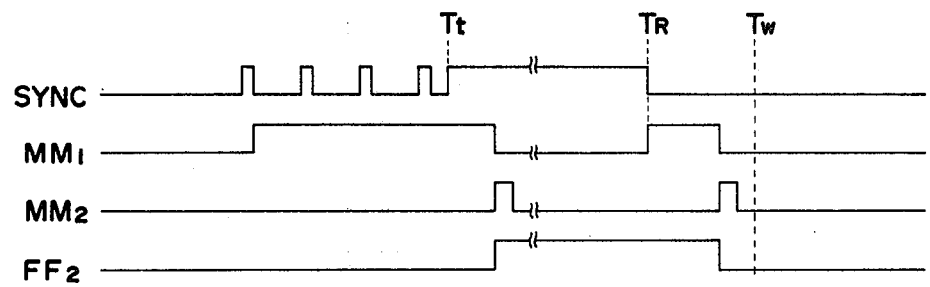
Figure 5C:
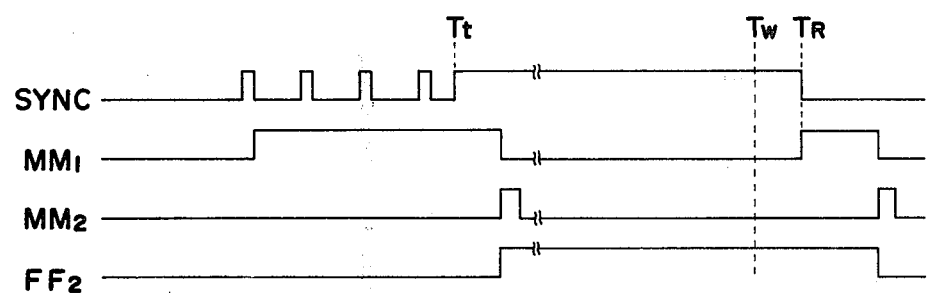

Provision of such trouble detection circuit enables detection on the transmission side of trouble on the reception side. FIGS. 5 are time charts useful for explaining the action of each portion. FIG. 5(a) shows the case where no trouble occurs, while FIGS. 5(b) and 5(c) show the cases where troubles take place, respectively. In FIG. 5(a), when the synchronizing signals SYNC ($S_4$, $S_6$ . . . ) are applied as input subsequent to the transmission start signal $S_3$, the output of the monostable multi-vibrator $MM_1$ is in the mode of logic "1" output while the synchronizing signals continue, that is to say, during the time $T_w$. The monostable multi-vibrator $MM_2$, which detects the rear end of this output, generates one pulse as its output after the passage of the time $T_w$. Through the output of the monostable multi-vibrator $MM_2$ reaches the gate $G_5$ through the gate $G_3$, no input is applied to the flip-flop $FF_3$ and the gate $G_5$ is closed so that the output of the multi-vibrator $MM_2$ is blocked and no change occurs in the state of the flip-flop $FF_2$.

Next, FIG. 5(b) shows the state where a trouble occurs at the time $T_t$ during reception and the trouble is removed at the time $T_R$. Since the synchronizing signals SYNC terminate at the time $T_t$, the output of the monostable multi-vibrator $MM_1$ changes to the logic "0" at the time $T_t$ and produces one pulse at the time $T_R$. The output of the monostable multi-vibrator $MM_2$ produces as output two pulses till time $T_w$ and these signals pass through the gate $G_2$ and flow into the flip-flop $FF_3$ as the set input and at the same time, set and reset the flip-flop $FF_2$. Consequently, the set period of the flip-flop $FF_2$ is generated as an output representing the trouble-occurring period.

FIG. 5 (c) shows the case where the release of the trouble is made after the passage of the time $T_w$. When the trouble is released at the time $T_R$ after $T_w$, the pulse of the monostable multi-vibrator $MM_2$ at the time $T_R$ flows through the gate $G_3$ and through the gate $G_5$ to reset the flip-flop $FF_2$ since the flip-flop $FF_3$ is set. In this case, too, the output of the flip-flop $FF_2$ is set during the trouble period from the time $T_t$ to $T_R$ and is able to detect the trouble.

As described in the foregong paragraph, in the trouble detection system in accordance with the present invention, the trouble detection on the reception side is carried out by stopping the transmission of the synchronizing signals while the stop of the synchronizing signals is detected by the re-trigger type monostable multi-vibrator on the reception side. Accordingly, the trouble detection system can be adapted to the transmission-reception apparatus of the bidirectional signal transmission-reception system using the single transmission line, can detect troubles in a reliable manner using a relatively simple circuit and enables to detect the trouble period of the reception side on the transmission side.

What is claimed is:

1. Transmission-reception apparatus comprising a pair of stations connected by a single transmission channel, each of said stations being capable of operating in a receiving mode in which it accepts inputs from the other and in a transmitting mode in which it emits inputs to the other, at least one of said stations being capable of receiving and processing information signals transmitted to it by the other station, said apparatus being characterized by:
   A. said one of said stations having control means for emitting successive synchronizing pulses at regular intervals;
   B. said one station further having means comprising gate means for transiently converting said one station from its receiving mode to its transmitting mode during the emission of each synchronizing pulse;
   C. said other station having means comprising a monostable multi-vibrator and gate means
      (1) for maintaining said other station in its transmitting mode for a period which begins upon receipt by said other station of each synchronizing pulse and which has a predetermined duration that is not longer than the interval between successive synchronizing pulses,
      (2) for converting said other station to its receiving mode upon termination of each said period, and
      (3) for emitting an information signal during each said period.

2. The transmission-reception apparatus as defined in claim 1 wherein each station is equipped with a counter for counting the number of signal receptions, a decoder for decoding the output of the counter and means for discriminating the reception signals by means of the output of the decoder.

3. The transmission-reception apparatus as defined in claim 1 wherein each station when operating in the transmitting mode uses synchronizing signals as the input to a re-trigger type monostable multi-vibrator having a time constant larger than the period of the synchronizing signals and detects the absence and presence of trouble of the station operating in the receiving mode by detecting whether or not the output of the re-trigger type monostable multi-vibrator is interrupted, the synchronizing signals being sent periodically from the receiver station to the transmitter station and stopped at the time of trouble of the receiver station.

* * * * *